(12) United States Patent
Slater et al.

(10) Patent No.: US 6,545,440 B2
(45) Date of Patent: Apr. 8, 2003

(54) HIGH PRECISION CARTESIAN ROBOT FOR A PLANAR SCANNER

(75) Inventors: Dan Slater, La Habra Heights, CA (US); Frank R. Mitchell, South Pasadena, CA (US)

(73) Assignee: Nearfield Systems, Inc., Carson, CA (US)

( * ) Notice: Subject to any disclaimer, the term of this patent is extended or adjusted under 35 U.S.C. 154(b) by 0 days.

(21) Appl. No.: 09/873,907

(22) Filed: Jun. 4, 2001

(65) Prior Publication Data

US 2002/0180393 A1 Dec. 5, 2002

(51) Int. Cl.[7] .............................................. G05B 19/10
(52) U.S. Cl. .................... 318/567; 318/568.11; 901/16; 414/749
(58) Field of Search ................................. 318/687, 567, 318/568.11, 568.2; 901/9, 11, 13, 16; 414/751.1, 749

(56) References Cited

U.S. PATENT DOCUMENTS

| | | | |
|---|---|---|---|
| 4,466,770 A | * | 8/1984 | Peroutky .................... 414/751 |
| 4,571,149 A | * | 2/1986 | Soroka et al. ................ 901/13 |
| 5,408,318 A | | 4/1995 | Slater |
| 5,419,631 A | | 5/1995 | Slater |
| 5,838,430 A | | 11/1998 | Slater et al. |

* cited by examiner

Primary Examiner—Khanh Dang
(74) Attorney, Agent, or Firm—O'Melveny & Myers LLP (57) ABSTRACT

A Cartesian robot comprises a base member disposed along an x-axis, a transverse member moveably mounted to the base member, and disposed along a y-axis transverse to the x-axis. The robot has a y-carriage for a measurement probe moveably mounted to the transverse member along the y-axis. The x, y, and z axes define a Cartesian coordinate system. The robot includes an innovative structure that achieves high precision with respect to the z-axis by providing a planarized and stable reference surface along the y-axis (vertical axis). The position of the y-carriage with respect to a z-axis is a predictable function of the measured position of the y-carriage on the reference surface, and rigid-body tilt of the reference surface. High accuracy and precision are achieved by utilizing a granite slab for providing the planarized reference surface disposed along the y-axis for the transverse member. The granite slab is supported by a structural frame, and a measurement probe may be mounted to a y-carriage which is moveably mounted to the reference surface of the granite slab. The Cartesian robot is especially suitable for near-field antenna-measuring scanners that require high precision, such as scanners for high-frequency antenna.

24 Claims, 8 Drawing Sheets

HIGH PRECISION CARTESIAN ROBOT FOR A PLANAR SCANNER

BACKGROUND OF THE INVENTION

1. Field of the Invention

The present invention relates to two-axis measurement systems, and more particularly, to a high precision, Cartesian robot for a scanner, such as used for performing near-field antenna measurements with very precise planarity.

2. Description of Related Art

High performance antennas are becoming increasingly prevalent as spacecraft, aircraft, ship and ground vehicle mission requirements become more sophisticated. High performance antennas, in turn, require increasingly precise measurements of antenna performance. According to one prior art method, antenna measurement is conducted by placing the antenna at a remote location to measure the amplitude response characteristics of the antenna in its operational range. Typical operational distances for high gain antennas can range from fifty feet to three miles. This measurement technique, called far-field testing, suffers from limitations such as susceptibility to weather effects, ground reflections, and availability of adequate real estate.

Near-field testing has been developed as an alternative to far-field testing. A near field test is conducted in close proximity to the antenna, using a microwave probe to sample the field radiated near the antenna under test (AUT). A computer collects the amplitude and phase data sampled by the microwave probe, and calculates the far-field equivalent using a Fourier transform technique. Accurate near-field measurements require that all the significant antenna energy be sampled by the microwave probe. Highly directive antennas, such as reflectors and wave guide phased arrays, beam most of the energy in the forward direction normal to the antenna aperture. To test these types of antennas, a planar near-field robotic scanner is utilized to move the microwave probe along a planar pattern approximately normal to the antenna aperture. To accurately reconstruct the measured field, the probe samples the antenna energy at a plurality of points within a minimum spacing determined by the Nyquist sampling theorem. As the minimum wavelength decreases at increased antenna frequencies, ever-higher scanner planarity and/or positional accuracy are required. A near-field measurement system of this type is described in co-owned U.S. Pat. No. 5,408,318 to Slater, for WIDE RANGE STRAIGHTNESS MEASURING SYSTEM USING A POLARIZED MULTIPLEXED INTERFEROMETER AND CENTERED SHIFT MEASUREMENT OF BEAM POLARIZATION COMPONENTS, the subject matter of which is incorporated herein by reference. Further details of near-field scanner technology are provided in the book NEAR-FIELD ANTENNA MEASUREMENTS, by Dan Slater, published 1991 by Artech House, Inc., ISBN 0-89006-361-3, which is cataloged in the Library of Congress under Card. No. 91-2133, and particularly, Chapter Seven thereof; which book is incorporated herein, in its entirety, by reference.

The near-field measurement technique is also applicable to other types of reflecting bodies, emitters/receptors, or transducers, or other sources of waveforms, including all types of electromagnetic, optical, and acoustic waves, by selection of a suitable probe. The technique is thus effective in measuring the performance of antennas, lenses, and anechoic chambers. The measuring probe may act as both a transmitter and a receiver for measuring a reflected phase front from a reflecting body. The various wave sources discussed herein, including both reflecting or emitting bodies, are collectively referred to as antennas or transducers.

To test highly-directive antennas, such as reflectors and wave guide phased arrays, a planar near-field scanner is utilized. Precision positioning systems, such as Cartesian robots, are used to move the measuring probe along a planar scanning path, such as a raster pattern, approximately normal to the antenna aperture. To accurately reconstruct the measured field, the probe must sample points at some minimum spacing which is usually less than half the wavelength of the antenna signal ($\lambda/2$). Therefore, to achieve an accurate near-field measurement, the precise position of the and its planarity with respect to the AUT is critical. For example, in a conventional prior art scanner, a planar precision of about $2.5 \times 10^{-5}$ meters (0.001 inches) rms is typically achieved over the primary central measurement region.

Furthermore, as signal wavelength becomes smaller, it becomes increasingly difficult to maintain the desired scanner planarity. Operation at higher radio-frequency (RF) frequencies, such as at about 650 GHz as used by astronomical and Earth limb sounding satellite instruments, requires higher planarity because of the sub-millimeter wavelengths at higher frequencies. Newer submillimeter wave antennas are larger, requiring that the scanner be accurate over a still larger area. In the past, high-precision scanners capable of measuring submillimeter-wavelength antennas have been constructed using massive granite platforms. Granite offers greater stability than metallic structures, such as aluminum or steel frames. Although granite slabs are not absolutely stable, granite tends to introduce positional errors that vary spatially relatively slowly, and are therefore more readily compensated for, compared to a much more random and spatially rapidly varying error pattern introduced by metallic structures. However, as scanner size increases, granite scanners according to the prior art become extremely heavy and prohibitively expensive. For example, one massive granite-type high-precision scanner capable of operating within a planarity of $5 \times 10^{-6}$ meters (0.0002 inches) rms over a 2.4 meter (8 feet) central scan area weighed in excess of about $2 \times 10^4$ kilograms (about 20 tons). Such a massive scanner is much more expensive to construct and install than typical Cartesian robot systems used for conventional scanners, which comprise aluminum or steel structures. However, metallic-structure based scanners are much less precise in planarity, and are less accurate positionally than massive granite-type scanners. Furthermore, position sensing and correction methods which are used with metallic-structure type scanners are in some cases incapable of achieving the desired planarity, and in other cases are undesirably costly or cumbersome.

Therefore, a high-precision planar scanner is needed, that is capable of the high precision of a massive granite-type scanner, but which uses less massive components is less expensive to construct, and which does not require a costly or cumbersome position sensing and correcting system.

SUMMARY OF THE INVENTION

The present invention provides a high precision Cartesian robot for a planar scanner capable of operating within a planarity as precise as massive granite scanners according to the prior art, while weighing approximately one-tenth as much. The high precision is achieved without the use of massive granite components, by use of an innovative design based on a relatively simple structure with well-defined and predictable errors, that are easily measured, and compensated for in acquired data. In particular, the present design utilizes a y-axis (vertical axis) structural member that is much straighter (i.e., having a precisely planar reference surface along its vertical axis) and more stable than corresponding steel or composite members in prior art scanners. The x-axis structural members need not be as precisely planar. The z-axis position of in the measuring probe is determinable to a high degree of precision based on the position of the measuring probe on the y-axis member, and a known, characteristic rigid-body tilt of the y-axis member as measured by a tilt sensor prior to the scanning process. Z-error, i.e., difference between the calculated z-position and an actual z-position of a measuring probe, is much less than previous scanners of comparable cost or weight. The innovative robot structure of the present invention minimizes unpredictable z-error, and thus provides an innovative and elegant solution to the problem of maintaining adequate planarity over the measurement area.

The Cartesian robot for a scanner according to the present invention preferably uses a combination of granite and steel components. The granite parts are much less massive than granite parts used in a conventional design, but still substantial enough to provide the stability granite is known for. In particular, the y-axis structural member comprises a highly planar vertical granite slab, which is unlike y-axis bridge structural members in prior art designs. The granite slab provides a reference surface for the y-carriage having a planarity of approximately $2.5 \times 10^{-6}$ meters (0.0001 inches) rms. Because of the stability, rigidity, and planarity of the granite slab, the z-position of the y-carriage can readily be determined with the required degree of precision from the vertical position of the y-carriage and the tilt of the z-reference slab, both of which are readily measured. Any z-error introduced by lateral shifting of the x-carriage, which carries the granite slab, is also readily measured and compensated. The granite slab is preferably held in place and supported by steel beam supports, by a pivoting bearing through its center. The tilt angle of the granite slab is adjusted by an adjustment screw at the base of the slab prior to the scanning process. The pivoting, center support system minimizes internal stresses in the vertical reference slab, and hence minimizes distortion of its reference surface. The Cartesian robot is thus capable of operating within a planarity of about $5 \times 10^{-6}$ meters (0.0002 inches) rms over a 2.4 meter (8 feet) square scan area, without using a control loop for z-axis positional control.

In a preferred embodiment, the x-axis structural member comprises a pair of substantially parallel granite bases. An x-carriage traveling on the granite bases carries the granite y-axis reference slab, and its steel supports. The configuration of the x-axis granite bases is consistent with conventional scanner robot technology. In particular, parallel rail-shaped granite bases, although less precise than the massive slabs used in prior art high precision scanners, are acceptable and preferred for use in embodiments according to the present invention. Considerable savings in weight and costs are thereby achieved.

A more complete understanding of the high precision Cartesian robot for a planar scanner will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a high precision Cartesian robot for a planar scanner, that overcomes the limitations of previous high precision planar scanners. In the detailed description that follows, like element numerals are used to describe like elements illustrated in one or more figures.

Figure 1A:
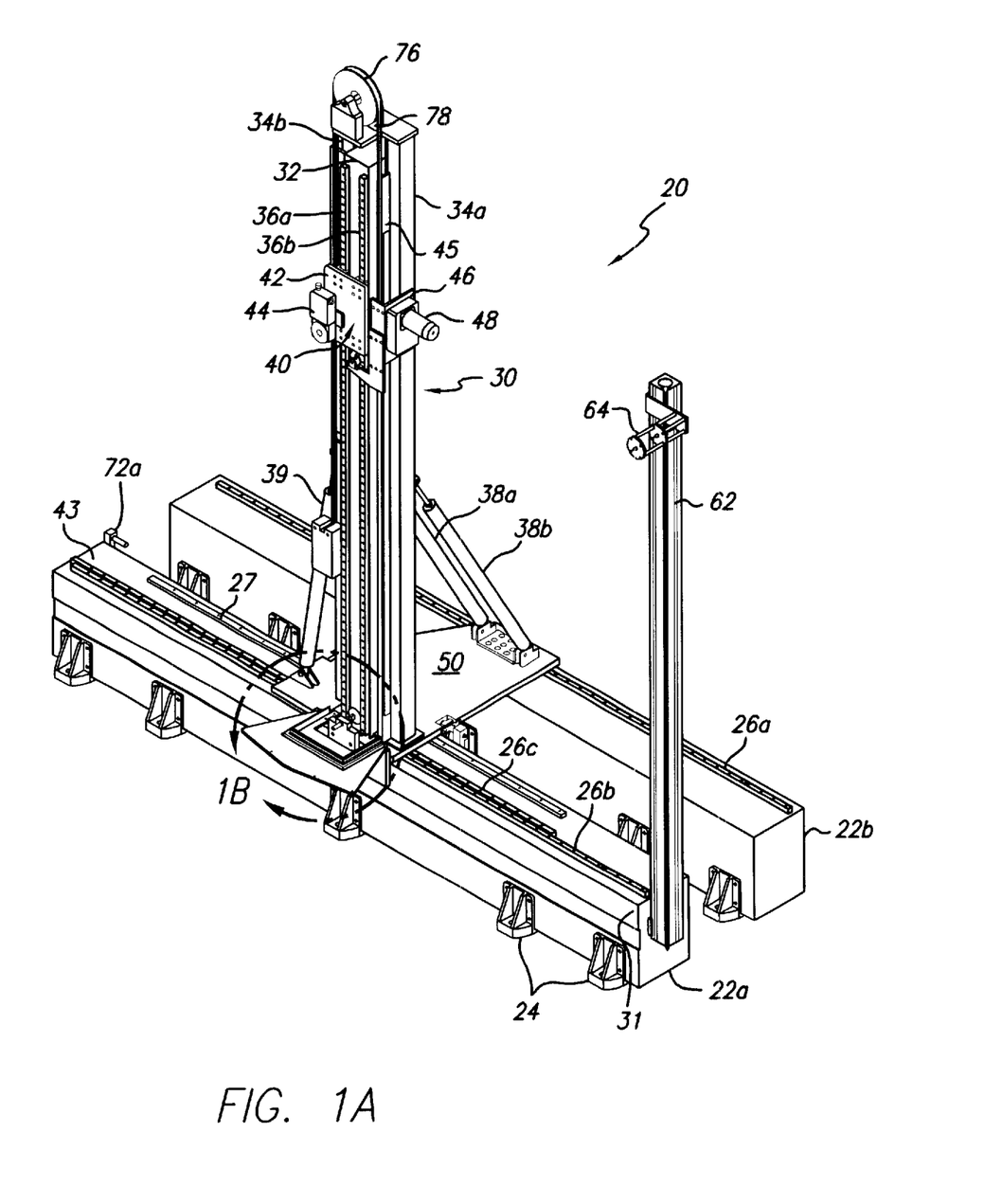
FIG. 1A is a perspective view of an exemplary high-precision Cartesian robot for a planar scanner according to the present invention.

FIG. 1A shows a perspective view of an exemplary high precision Cartesian robot 20 according to an embodiment of the present invention. Alternative views of the same exemplary embodiment of robot 20 are shown in FIGS. 1B–8, and the following description accordingly relates to all of FIGS. 1A–8, wherever the enumerated elements are shown. The Cartesian robot 20 comprises a base member, which preferably comprises a pair of precision-lapped, natural close-grained granite bases 22a, 22b. Granite bases 22a, 22b are generally rail-shaped and rectangular in cross-section, and are disposed in parallel with their long axes disposed along a first axis, which conventionally defines the x-axis of a Cartesian coordinate system. Granite bases 22a, 22b are supported by a plurality of metallic support pads 24 for resting on a suitable substrate 102, such as the concrete floor of a test facility. Typically, a commercially available "fixator" (not shown) is placed between each support pad and the mounting substrate, for leveling the support pads. More elaborate mounting systems, such as Airy point suspensions and carriage mass unloading systems, are not generally required with the present invention, but may be employed in certain circumstances. Primary granite base 22a is provided with a planar y-reference surface 43 extending in a plane along the length of base 22a. Y-reference surface 43 is preferably integral with base 22a and may be formed by precision-lapping an upper surface of the base as known in the art. In the alternative, but less preferably, the y-reference surface may be formed from a separate piece that is attached to the base. In addition, one of the granite bases, preferably granite base 22a, is preferably provided with a z-axis reference surface 31 on a face of base 22a substantially parallel to an x-y plane of robot 20. Reference surface 31 preferably extends in the x-direction along substantially all of the length of base 22a.

Cartesian robot 20 additionally comprises a transverse member 30 having a length disposed generally along, or at a constant angle to, a second axis that is transverse to the x-axis. Conventionally, the second axis defines the y-axis of a Cartesian coordinate system. Transverse member comprises a reference slab 32, that is preferably comprised of a natural, close-grained granite material. Close-grained granite is preferable because it is commercially available for measurement applications, it may be precision lapped without creating residual stress, is stable, is relatively strong, rigid, and hard, and is otherwise well-known as a material for measurement applications. Slab 32 is provided with a planar z-reference surface 33 extending along its length, preferably having a planarity of approximately $2.5 \times 10^{-6}$ meters (0.0001 inches) rms. Z-reference surface 33 is preferably integral with slab 32 and may be formed by precision-lapping a suitably-oriented surface of the slab as known in the art. In the alternative, but less preferably, the z-reference surface may be formed from a separate piece that is then attached to a face of the reference slab. Per unit length, granite slab 32 is preferably about one-quarter to one-half the weight of each granite 22a, 22b. Although the term "granite slab" is generally used herein to refer to the reference slab 32, it should be appreciated that the invention is not limited thereby. Other materials having properties comparable to close-grained granite may also be used to make reference slabs.

Transverse member 30 is moveably mounted to y-reference surface 43. In a preferred embodiment, the transverse member 30, comprising granite slab 32, is preferably supported by a support member, such as the structural frame comprised of vertical supports 34a, 34b, and angle struts 38a, 38b, and 39. The structural frame is, in turn, mounted to an x-carriage 50, which is moveably mounted to the y-reference surface 43 of base 22a, whereby the transverse member 30 may move along an x-axis parallel to the plane of y-reference surface 43. Primary granite base 22a is preferably positioned directly underneath the transverse member 30, and supports most of the weight of the transverse member. Granite base 22b is preferably positioned as an outrigger supporting struts 38a and 38b.

Preferably, a pivoting or pinned mounting system is used to support granite slab 32 to eliminate moment loads on the slab. Further details of a preferred support system for reference slab 32 are described below in connection with FIG. 7. Reference slab 32 is suspended a slight distance above carriage 50 by the structural frame. Vertical supports 34a, 34b stand on opposite sides of granite slab 32 aligned generally with the y-axis of robot 20 to support the pivoting slab bearing 106 (shown in FIG. 7) and y-carriage pulley 76, while struts 38a–b, 39 provide lateral stability to the frame. Frame members, including the supports 34a, 34b, struts 38a–b, and strut 39, are preferably comprised of a metallic structural material, such as steel or aluminum. In the alternative, composite materials such as carbon fiber or glass fiber composites may be used. Supports 34a, 34b are preferably primarily supported by struts 38a–b, 39 at or near the middle joints 35a, 35b. Angle struts 38a–b, 39 are preferably mounted by single pins to brackets on carriage 50 and to supports 34a and 34b, and accordingly function as pure compression or tension frame members.

Figure 1B:
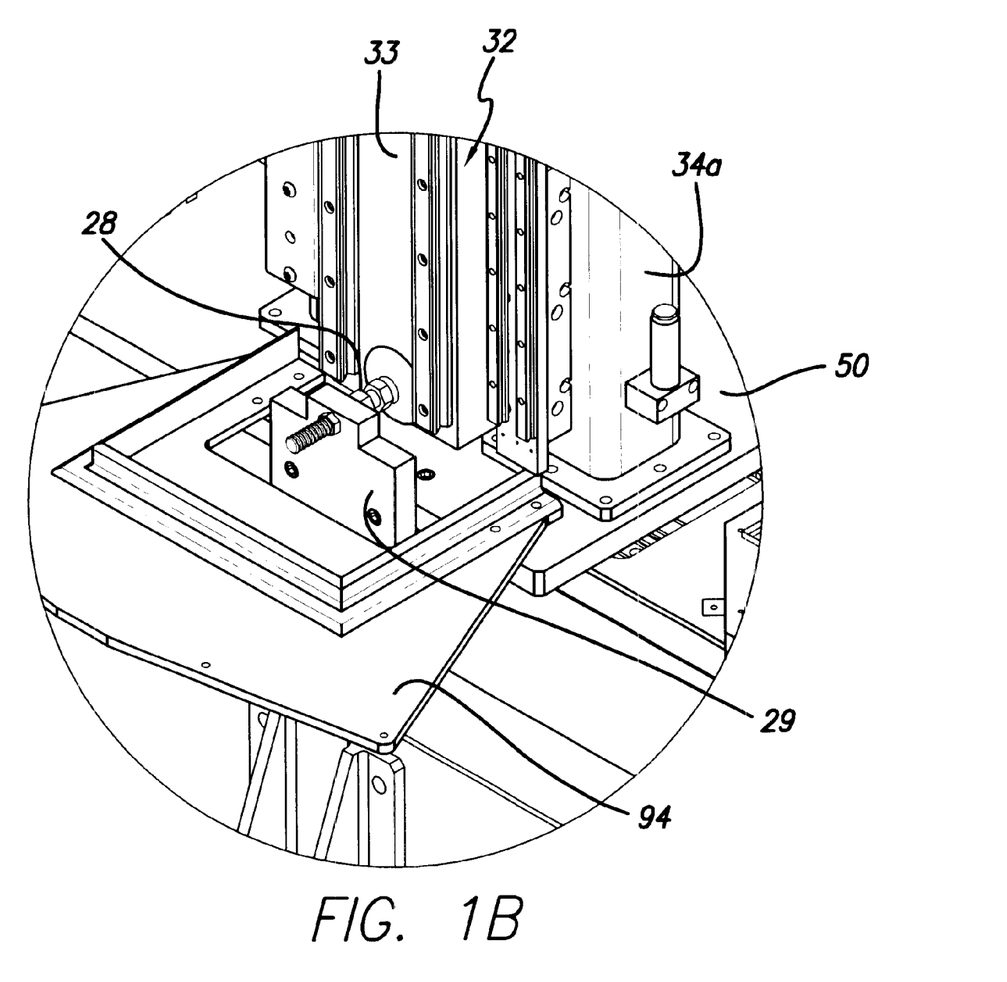
FIG. 1B is a detail perspective view showing the tilt adjustment screw at an end the reference slab.
Figure 2:
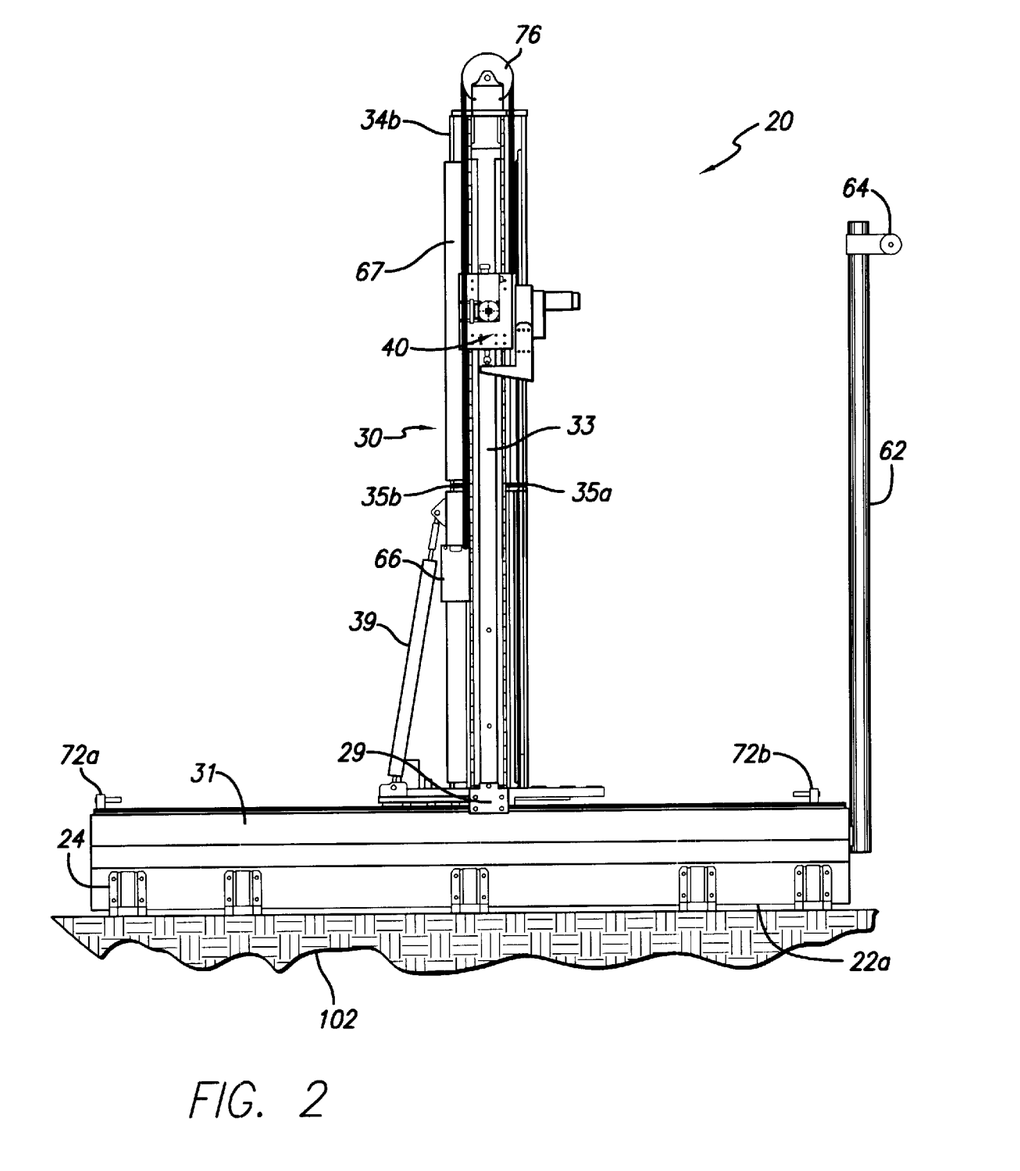
FIG. 2 is a side elevation view, looking in a direction parallel to the z-axis, of the Cartesian robot shown in FIG. 1A.

It should be apparent that transverse member 30 may be designed in various alternative ways, but in each case should define a structurally rigid and stable y-axis with a precisely planar z-reference surface. That is, transient and static flexure or deformation of member 30 should have a relatively insignificant effect on the position of the measurement probe during operation of the scanner. Also, member 30 is preferably supported such that significant rigid body rotational movement of member 30 around the x-axis does not occur during operation, although the angle of tilt of member 30 may be adjusted at periodic intervals. Tilt of member 30 may be stabilized and adjusted using an adjustment screw 28, such as a conventional machine screw, threaded through adjustment block 29 that is secured to x-carriage 50 opposite a lower end of granite slab 32, as shown in FIG. 1B. One end of adjustment screw 28 rests against z-reference surface 33 of slab 32, or against another suitably exposed portion of the slab's lower end. The tilt of slab 32 may be adjusted by turning adjustment screw 28. When the desired tilt angle is achieved, adjustment screw 28 is preferably secured to adjustment block 29 by tightening a set of two or more jam nuts. For static stability, slab 32 pressed against adjustment screw 28 by a suitably located compression spring (not shown).

Incidentally, FIG. 1B shows a mounting bracket 94 for a pair of RFI shields (not shown), as are conventional in the art. A corresponding second mounting bracket (not shown) may be mounted to the top of structural member 30 adjacent to pulley 76, shown in FIG. 1A. As known in the art, two parallel RFI shields preferably extend along the length of vertical member 30 between lower bracket 94 and a corresponding upper bracket, providing a narrow slit between them positioned over the vertical path of a measurement probe attached to the y-carriage 40. For illustrative clarity, these conventional elements (RFI shields, shield mounting brackets, and measurement probes) have generally been omitted from the drawings.

Figures 3A, 3B:
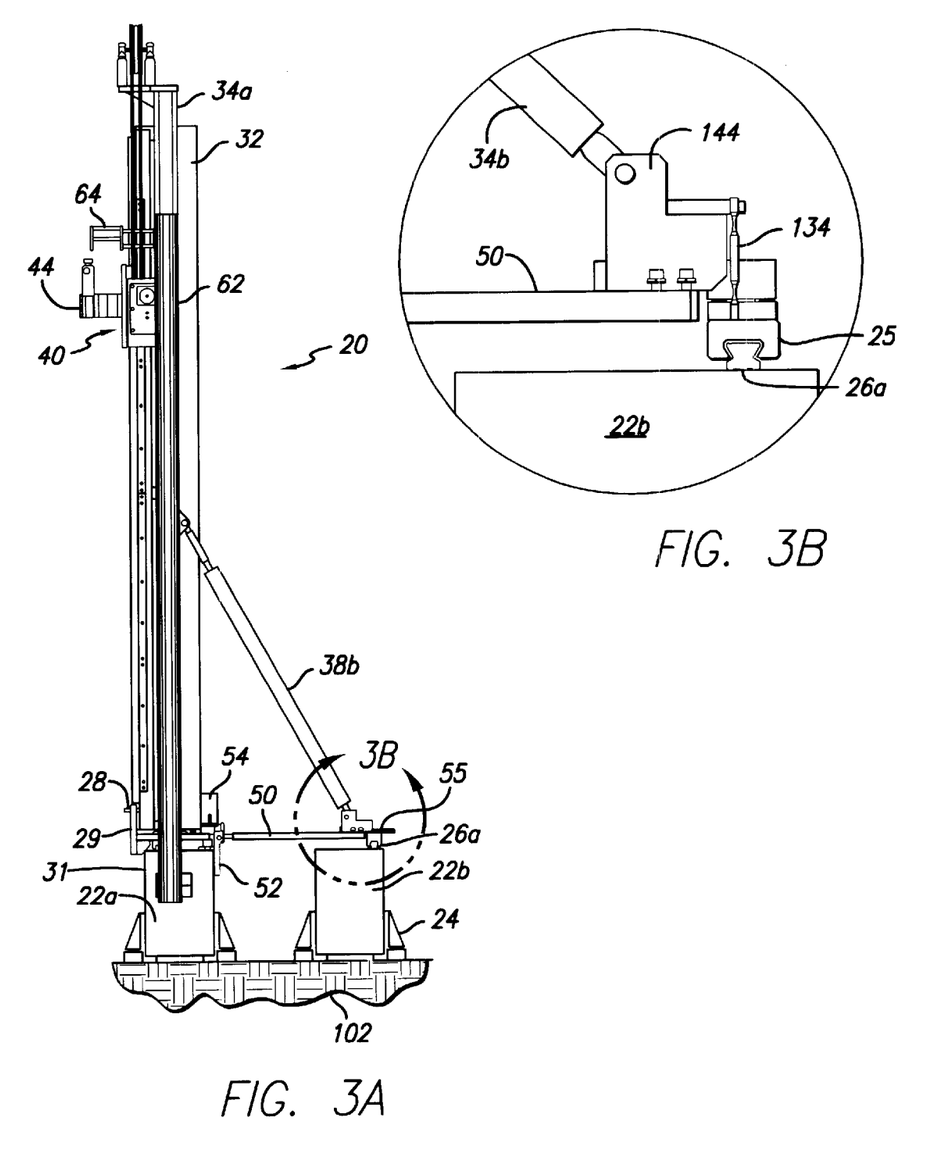
FIG. 3A is a side elevation view, looking in a direction parallel to the x-axis, of the Cartesian robot shown in FIG. 1A.
FIG. 3B is a side elevation view of an exemplary flexible suspension system for use on the outrigger support base.
Figure 4:
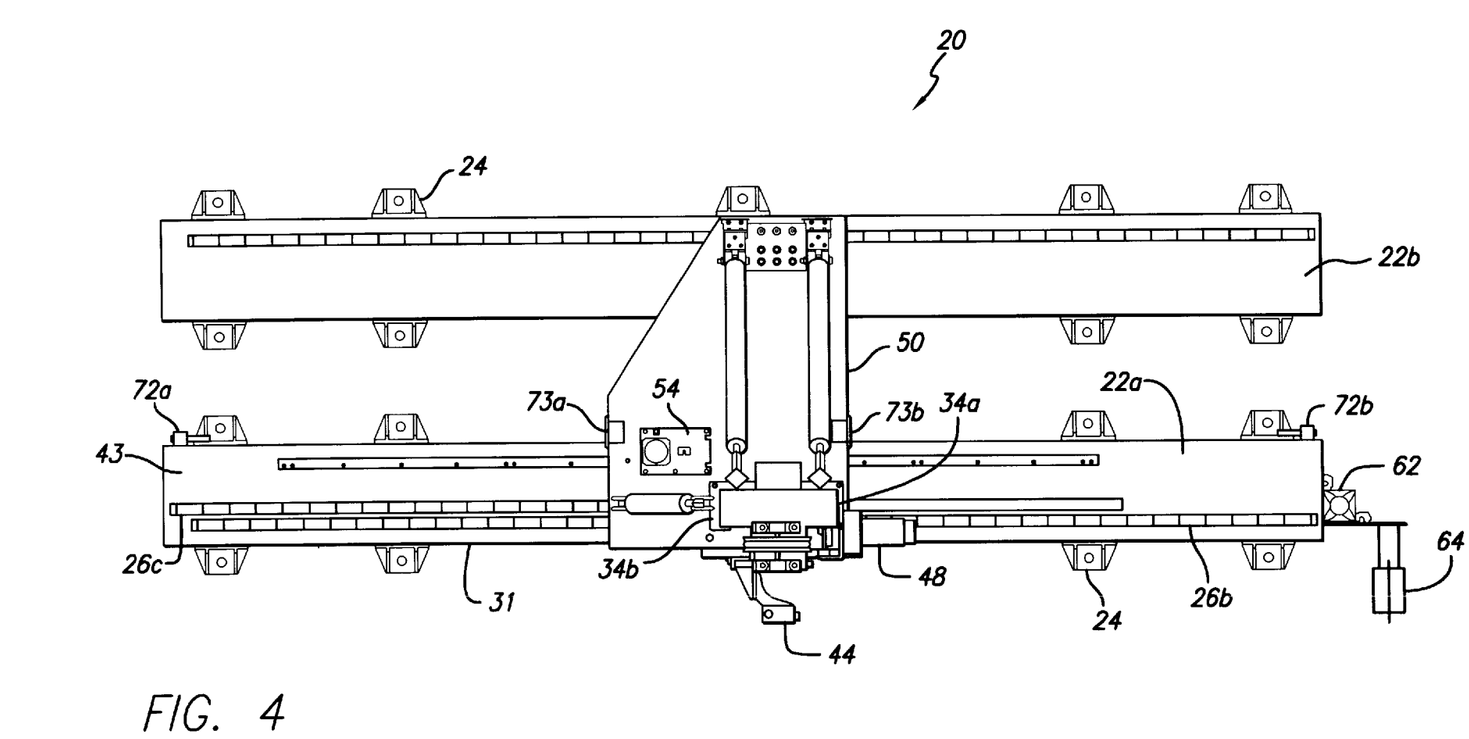
FIG. 4 is a plan view of the Cartesian robot shown in FIG. 1A.
Figure 8:
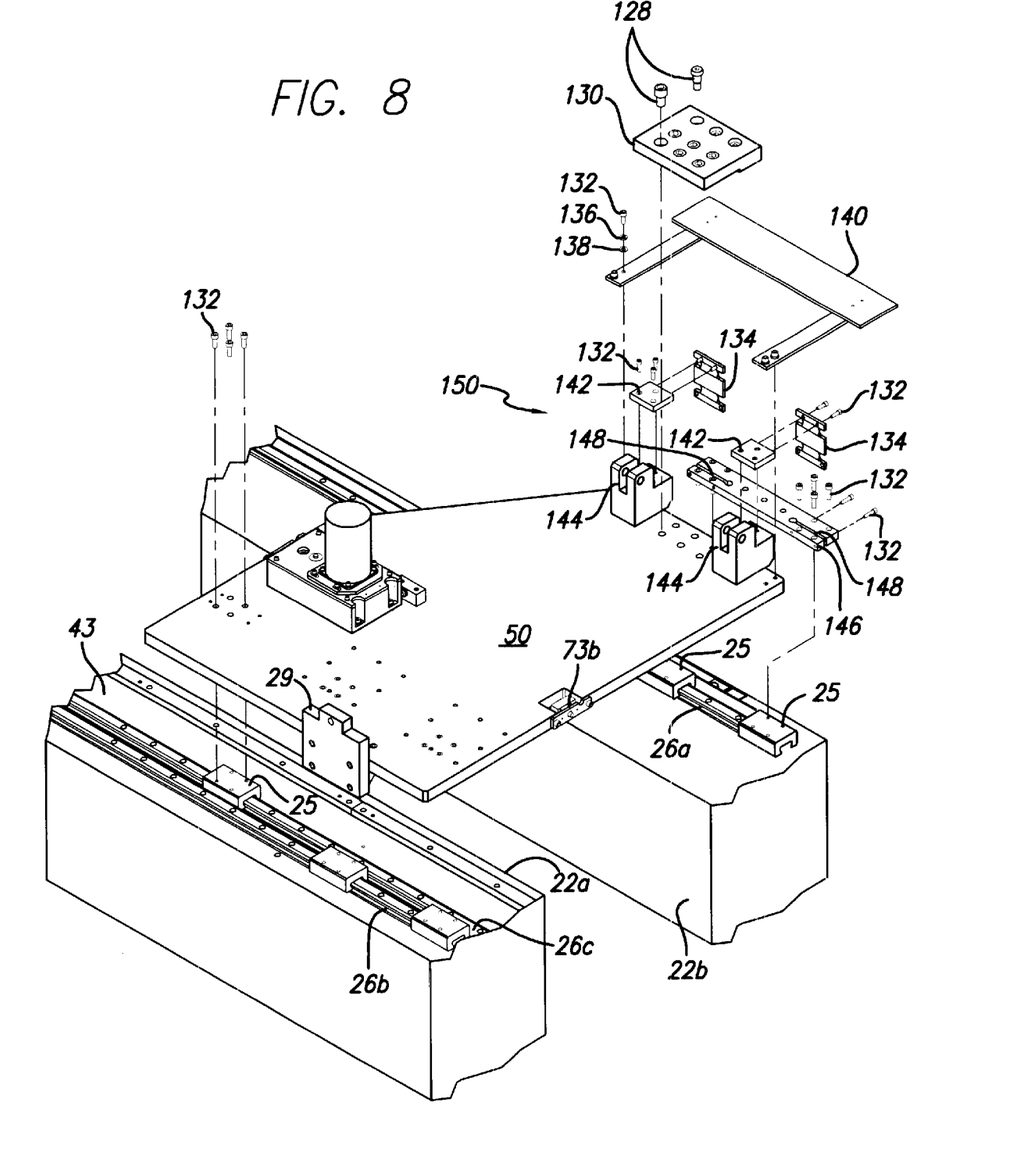
FIG. 8 is an exploded perspective view of the x-carriage, showing details of an exemplary flexible suspension system.

Referring again to FIG. 1A, the transverse member 30 is moveably mounted to the pair of granite bases 22a, 22b by mounting to an x-carriage 50 which in turn slides (such as by rolling) along rails 26a, 26b, 26c. Rails 26a–c and corresponding bearings 25, as shown, e.g., in FIGS. 3B and 8, comprise conventional oil or grease-lubricated, high-precision linear roller bearings. In the alternative, air bearings may be used. Safety plate 52, shown in FIG. 3A, comprises a safety feature to hold x-carriage 50 in the event of an off-track upset. X-carriage 50 is preferably driven along the granite bases 22a–b by a stepper motor 54, shown in FIGS. 3A and 4, coupled to a precision rack and pinion system, of which rack 27 is shown, e.g., in FIGS. 1A and 4. Alternative bearings and drives may be used, such as servo motors and/or friction drives, as further described in the references incorporated herein, or as otherwise known in the art. X-carriage 50 is preferably supported by a four-point suspension on its underside, with each suspension point comprising a bearing 25 on one of rails 26a–26c, as shown in FIGS. 3A–3B and 8. To reduce flexure of x-carriage 50 and frame members 34a–b, each of support struts 38a–b, 39 is preferably aligned with and positioned between one of the bearings 25 and one of the frame middle joints 35a–b.

Cable support 64, as shown in FIGS. 1A, 2, 3A, and 4, is statically mounted to vertical post 62 for supporting a reference cable as known in the art. For illustrative clarity, the reference cable is not shown in the drawings, but it should be appreciated that one end of the reference cable will be connected to the measurement probe on the y-carriage, and the other end of the cable will be connected to an externally-mounted measurement and control system, as known in the art. In general, it should be appreciated that robot 20 is provided with other conventional cabling and associated features for transmission of electrical power and data, although FIGS. 1A–8 generally omit cabling features for illustrative clarity. In addition, a computer (not shown) is operatively associated with the external measurement and control system as known in the art, for purposes including but not limited to robot control, measurement data acquisition, data processing, and data storage. Various cabling, electronic, cooling, computer hardware and software features, and certain other details of robot 20, which are not shown in FIGS. 1A–8 or otherwise described above, may be as described in the incorporated references, and/or may be selected or suitably adapted from prior art scanners by one of ordinary skill in the art.

Figure 6:
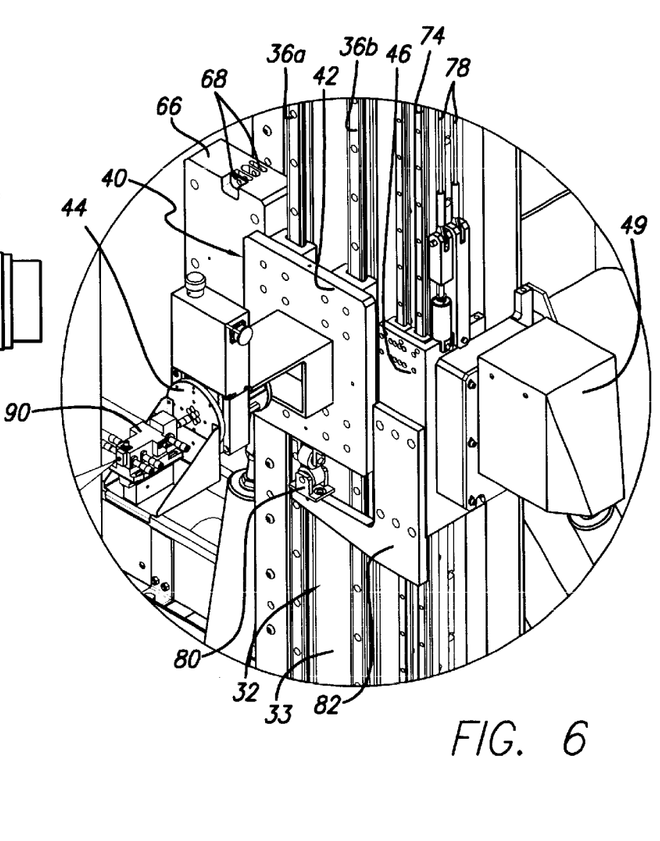
FIG. 6 is a detail perspective view of the components shown in FIG. 5.

A measurement probe, such as microwave probe 90 shown in FIG. 6, may be mounted to y-carriage 40 via a probe bracket 44. It should be apparent that various different types of probes may be mounted to probe bracket 44 in a position similar to probe 90, and accordingly, the drawings generally do not show a measurement probe. Y-carriage 40 is movably mounted to the z-reference surface 33 of slab 32, such as by mounting to vertical linear bearings 36*a*, 36*b*, which are in turn mounted to the z-reference surface. The y-carriage thereby can move along an axis that is parallel to the plane of reference surface 33, and therefore along, or inclined at a constant angle to, a y-axis. It should be appreciated that, although the axis defined by the z-reference surface 33 is not generally exactly parallel to the y-axis of a Cartesian coordinate system, it will be inclined to a y-axis at a constant angle (typically, less than 5°) that is readily measured and controlled, and therefore the z-reference surface may be used to define a y-axis effectively. The y-carriage is therefore positioned to scan in a plane defined by a position along the z-axis, i.e., a z-position.

Like the x-carriage 50, y-carriage 40 is preferably driven by a stepper motor 48 coupled to a precision pinion and rack 45 by drive frame 46. Stepper motor 48 is enclosed by a vacuum inlet shroud 49 shown in FIG. 6. Ambient temperature-controlled air may be drawn into shroud 49 through a duct and vacuum system (not shown), thereby cooling motor 48 and preventing introduction of measurement error caused by heat from the motor. Similar methods may be used to control the temperature of motor 54 on the x-carriage. Similarly, alternative bearings and drive systems for the y-carriage may be as described in the incorporated references, or as known in the art. For near-field antenna measurement applications, the measurement probe comprises an antenna. It should be appreciated, however, that any type of probe-type measurement or signaling device may be mounted to the y-carriage 40, including but not limited to optical sensors, microphones, laser range finders, and touch probes.

Figure 5:
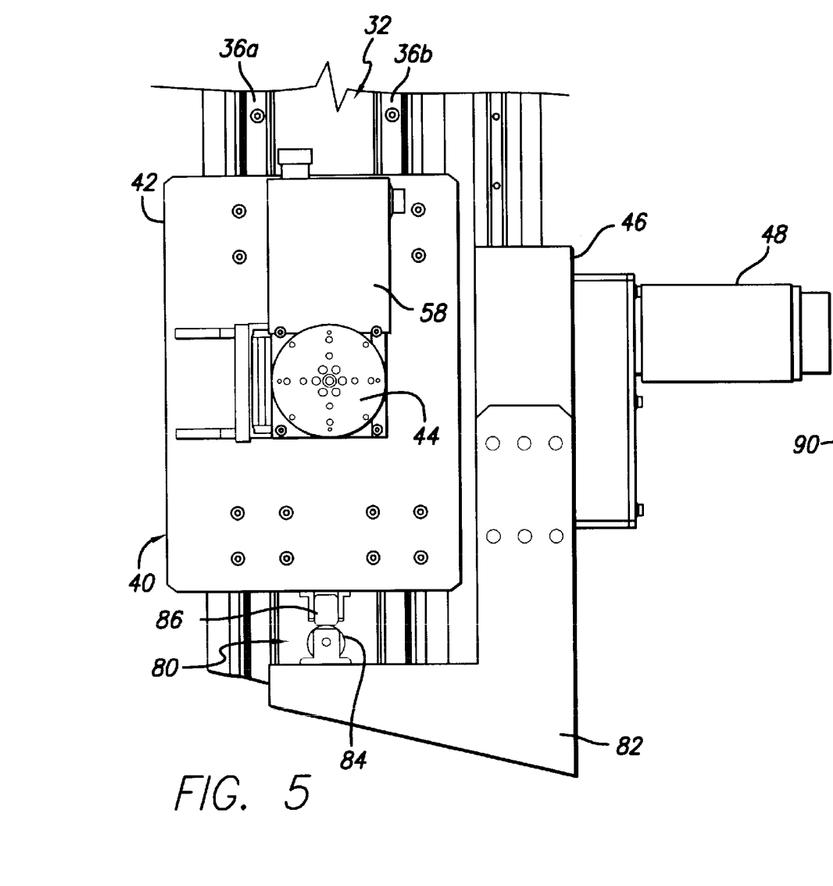
FIG. 5 is a detail, side elevation view of the y-carriage for the Cartesian robot shown in FIG. 1A.

Probe bracket 44 is fixedly mounted to mounting plate 42, as shown in FIGS. 5 and 6. Electronic components for a measurement probe may be housed in housing 58. Details of the probe mounting system may vary as known in the art. For example, in an embodiment, to provide for adjustment along the z-axis, the probe bracket 44 may optionally be mounted to a z-axis stage on mounting plate 42 of y-carriage 40. A z-axis stage, if present, may provide for precise and relatively fine adjustments of probe 44's position along a third axis, i.e., z-axis, of the Cartesian coordinate system of robot 20. Various adjustment stages as known in the art may be used, so long as capable of repeatable adjustability within increments much less than the planarity requirement of robot 20, i.e., typically, much less than about $5 \times 10^{-6}$ meters (about 0.0002 inches). However, one of the advantages of the present invention is that, for typical near-field antenna measurements in the sub-millimeter range, a z-axis stage is not necessary, and is therefore preferably omitted.

The y-carriage 40 is comprised of three separate but co-moving carriages: the probe mounting plate 42, which is mounted to precision linear bearings 36*a–b*; the driving or motorized frame 46, which may be mounted to less precise linear bearings 74 on a surface of slab 32 adjacent to z-reference surface 33; and counterweight 66, shown in FIG. 6, which need not be mounted to a linear bearing at all. One or more, and preferably two, mechanical cables 78 are attached to driving frame 46, run over pulley 76 at the top of structural member 30 and attached to counterweight 66 at mounting holes 68. Counterweight 66 is preferably sized to weigh about the same as the sum total weight of driving frame 46, probe mounting plate 42, and their respective attachments. Driving frame 46 is coupled to and pushes probe mounting plate 42 through point support bearing 80 which is attached to pusher bracket 82 and, in turn, to the driving frame.

Point support bearing 80 preferably comprises two crossed rollers. An upper roller 86 is mounted to the center bottom edge of probe mounting plate 42, centered between linear bearing 36*a* and linear bearing 36*b*. Upper roller 86 is oriented with its cylindrical axis perpendicular to, and in a parallel plane with respect to, lower roller 84, which is mounted to an upper edge of pusher bracket 82. Probe mounting plate 42 slides freely on linear bearings 36*a–b*, and upper roller 86 is vertically aligned with lower roller 84, so that the cylindrical surfaces of both rollers contact each other in crossed at substantially a single point of contact. Point support bearing 80 thus isolates the probe mounting plate 42 from any significant torque or off-center forces generated by driving frame 46, which might contribute to unpredictable z-axis error.

The x- and y-carriages of robot 20 are preferably driven and controlled by a stepper motor using an open loop control system. Using commercially available motors and drive components, a precision and repeatability of less than about $2.5 \times 10^{-5}$ meters (about 0.001 inches) is achievable in the x and y axis. This level of precision should be acceptable for near-field antenna measurements in the sub-millimeter wavelength range. The position of the x-carriage and y-carriage may also be measured open-loop, by counting step increments of the respective x or y drive motor. In alternative embodiments, the position of the probe may be measured and controlled in a feedback control system by coupling known distance and angle measuring sensors to a drive system as known in the art. Suitable sensors may be combined into a position measurement system by adding a computer interface, related software, and a series of mechanical structures. Typical sensors comprise various types of interferometers, encoders, or equivalent devices as described in the incorporated references or otherwise known in the art. The mechanical structure of robot 20, comprising a measurement skeleton as known in the art, may be used to reference the various sensors to the world coordinate system. However, one of the advantages of the present invention is that a feedback control system, including elements such as an optical skeleton, is not required for many principle applications, such as measuring sub-millimeter wavelength antennas in the range of about 650 GHz.

Figure 7:
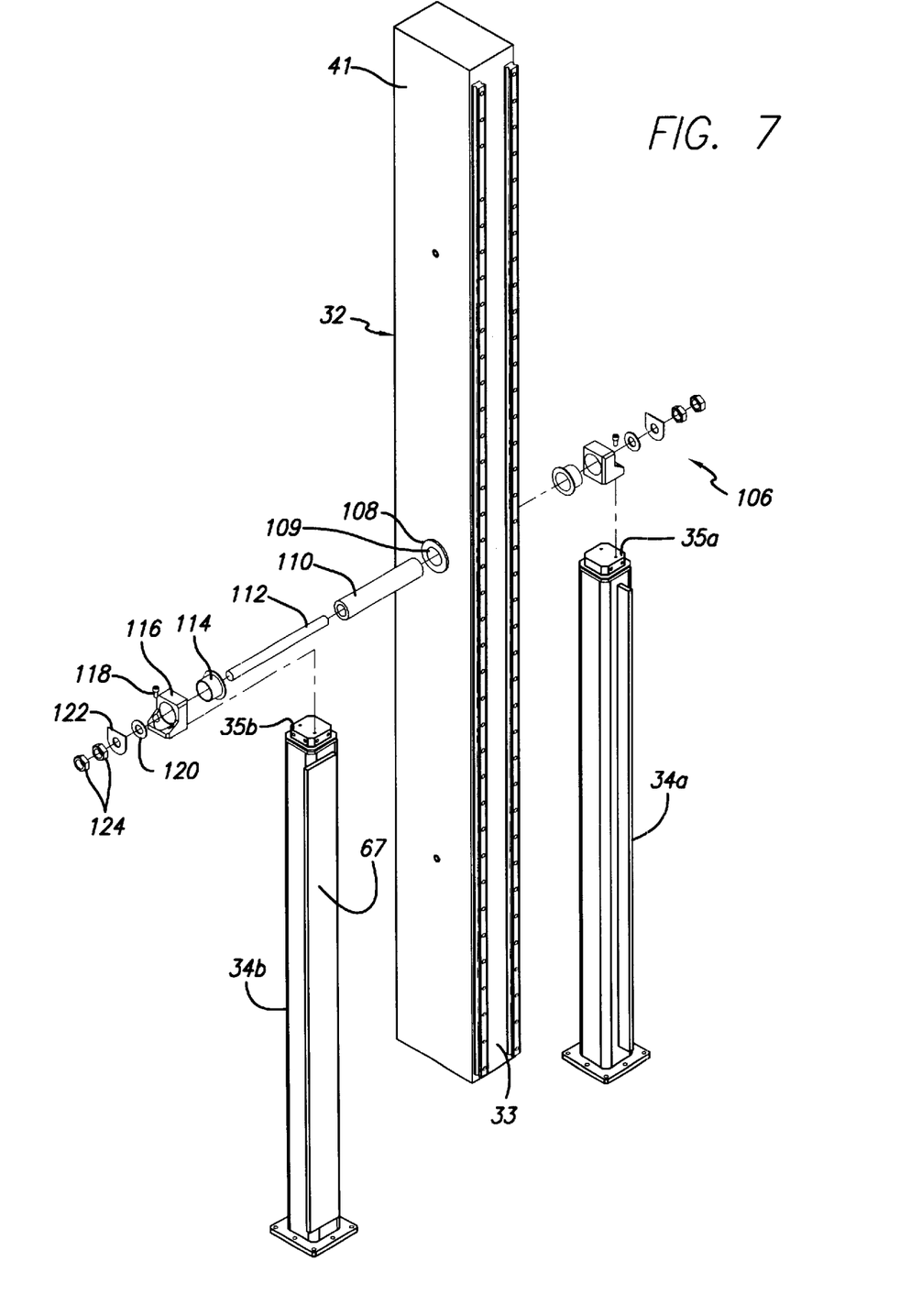
FIG. 7 is an exploded perspective view showing details of an exemplary z-reference slab (vertical slab) support system.

Details of an exemplary pivoting slab bearing assembly 106 are shown in FIG. 7, whereby the granite slab 32 is pivotally mounted to the structural frame. Granite slab 32 is provided with a through bore 108 in side 41. Bore 108 is preferably located with its center passing through, or very close to, the center of gravity of slab 32; that is, pivoting bearing assembly 106 is preferably mounted in granite slab 32 adjacent to the midpoint of its long axis. A bias in the tilt of slab 32, if desired, may be provided by suitably locating bore 108 slightly off the center of gravity; or in the alternative, a bias may be provided by attaching small weights at appropriate locations on slab 32 after the slab 32 has been mounted to the support members 34*a–b*. The components of bearing assembly 106 are conventional mechanical parts, as shown in FIG. 7. A suitable bearing sleeve 109 is inserted, such as by press fitting, into bore 108. A precision tubular shaft 110 is fit to the inside diameter of sleeve 109 so as to permit relative movement between shaft 110 and sleeve 109. A threaded tension rod 112 is inserted into sleeve 110. At either end of rod 112 and shaft 110, a flanged sleeve bearing 114 fits over shaft 110 and inside bearing block 116, which is attached to one of the support members 34*a–b* at middle joints 35*a–b*, respectively, using machine screws 118 (for illustrative clarity, not every screw is shown). A tombstone washer 122 and a thrust washer 120 is placed around rod 112 outside of bearing block 116, and the assembly is secured by jamb/retention nuts 124. An upper portion (not shown in FIG. 7, but shown, e.g., in FIGS. 1A and 2) of each support member 34*a–b* fits over the bearing blocks 116 and is secured to middle joints 35*a–b*, respectively. The center-bore mounting system just described advantageously minimizes internal stresses on slab 32. However, various other bearing assemblies, components, and or methods may be used to mount slab 32 to support members 34*a–b* and/or to x-carriage 50, without departing from the scope of the invention.

To prevent or reduce unwanted friction caused by minor misalignment between the x-carriage rails 26*a–c* and/or the carriage suspension points, the x-carriage 50 is preferably flexibly mounted to the outrigger rail 26*a* on granite base 22*b*, such as by a flexible mounting system 150 as shown in FIG. 8. Flexible mounting system 150 is substantially rigid in the x-direction, but flexible in the z-direction. This flexibility permits relative movement in the z-direction between the x-carriage and the outrigger rail 22*b*. No z-error is introduced by such relative movement, because the x-carriage remains stable with respect to the z-datum defined by the primary granite base 22*a*. However, the relative flexibility prevents excessive lateral forces (and hence, friction) between roller bearings 25 and outrigger rail 26*a*. Strut blocks 144 are mounted to x-carriage 50, and function as attachment points for the lateral support struts 38*a–b* and for the suspension to bearings 25. Bridge clamp 146 is mounted to both bearings 25 on rail 26*a*. A lower end of each flexure plate 134 is retained in each clamping groove 148 of the bridge clamp, and is secured by a suitable cap screw 132. The flexure plates are relative thin and flexible in the z-direction, but are substantially rigid in the x and y directions. An upper end of each flexure plate is secured to one of the top brackets 142, which is in turn secured to a corresponding one of the strut brackets 144. In comparison, the x-carriage is directly fastened with cap screws 132 to the bearings 25 on the primary granite base 22*a*. For illustrative clarity, many of the cap screws and like elements on the x-carriage are not shown in FIG. 8.

Connection plate 130 is secured to x-carriage 50 and to bridge clamp 146 using shoulder bolts 128. The connection plate is a safety feature to prevent capsizing of the x-carriage in the event of failure of the flexure plates. It does not carry a load during normal operation of the scanner. Hence, the shoulder bolts used to connect the connection plate to the bridge clamp are sized so as to leave a small amount of slack between the connection plate and the bridge clamp when the flexure plates 134 are in their normal operating position. Cable guide plate 140 is not a part of the flexible suspension system, although it is installed adjacent to the strut brackets 144 using cap screws 132 and washers 136, 138. The cable guide plate is a part of the cabling/ducting system for robot 20, the features of which are generally conventional and generally not shown in the drawings.

Exemplary operational steps of robot 20 are as follows. An angle measuring sensor, i.e., tilt sensor (not shown), such as an accelerometer-type electronic level using ether a fluid level or a force rebalance pendulum, may be used to measure the angle of rigid-body rotation (i.e., tilt) of structural member 30 relative to the x-axis and z-axis prior to the scanning process. Alternatively, any other angle-measuring device of equivalent or better precision, such as an optical straightness sensor, may be used to measure y-axis tilt. For near-field antenna measurement applications, robot 20 is especially sensitive to z-error, so measurement of tilt relative to the x-axis is especially important. A tilt sensor (not shown) may be temporarily mounted relatively close to probe bracket 44 prior to scanning, for example, on mounting plate 42. The tilt of slab 32 may be measured, and adjusted, if desired, using adjustment screw 28 while the tilt sensor is in position, after which it may be removed and set aside. In the alternative, a tilt sensor may be permanently mounted to y-carriage 40 or granite slab 32. Provided that structural member 30 is sufficiently rigid, stable and straight (as is the case, for example, with granite slab 32 and its z-reference surface 33), z-error introduced by tilt of slab 32 can be precisely calculated using trigonometry or equivalent numerical method, based on the y-position of probe 44 and the measured angle of tilt. Furthermore, because of the straightness and stability of the granite slab 32, the z-error can be quickly and precisely determined at the various positions of measurement probe along the y-axis. The tilt of slab 32 has been found to be sufficiently stable when robot 20 is configured as described herein, such that the angle of tilt may be assumed to be constant during operation of the scanner, i.e., real-time measurement and/or control of tilt is not required during data acquisition for typical sub-millimeter measurement applications. Z-correction based on the measured tilt may be applied to the acquired data during data processing using the measured z-error at each data location and the so-called K-correction method, or a related data correction method. In the alternative, the position of the measurement probe can be corrected in real time, for example, during a data acquisition operation. However, correction of z-position in real time requires a z-axis drive and control system, which may add undesirable complexity and cost. One of the advantages of the present invention is predictable z-error, which can readily be compensated for using "soft" data correction methods, thereby avoiding the need for a z-axis drive and control system for many applications.

An additional factor contributing to z-error is translation or "drift" of the y-axis, as defined by z-reference surface 33 of granite slab 32, relative to the x-axis. Such drift can be mechanically stabilized by referencing the position of the x-carriage to a precise granite surface located near the base of robot 20 and parallel to the x-axis, such as a reference surface 31 on granite base 22*a*. The planarity of reference surface 31 in the z-axis may be measured and characterized after installation of robot 20, and periodically thereafter, by sliding an autocollimator along surface 31 as known in the art (any other reference surface may similarly be characterized). The z-error characteristics of surface 31 may then be appropriately compensated for using a software or hardware method. Alternatively, or in addition, the z-translation of the y-axis structural member 30 can be measured with an optical straightness sensor, and an appropriate correction applied during data processing.

Having thus described a preferred embodiment of a high precision Cartesian robot for a planar scanner, it should be apparent to those skilled in the art that certain advantages of the within system have been achieved. It should also be appreciated that various modifications, adaptations, and alternative embodiments thereof may be made within the scope and spirit of the present invention. For example, a high precision Cartesian robot for a planar scanner for near-field antenna measurements has been illustrated, but it should be apparent that the inventive concepts described above would be equally applicable to other types of Cartesian robots, such as coordinate measuring machines. The invention is further defined by the following claims.

What is claimed is:

1. A Cartesian robot, comprising:
    a base member having a planar y-reference surface extending in a plane along a length of said base member;
    a transverse member moveably mounted to said y-reference surface to move along an x-axis parallel to the plane thereof, said transverse member comprising a reference slab supported by at least one support member, wherein said reference slab has a length transverse to the x-axis;
    a planar z-reference surface extending in a plane along the length of said reference slab; and
    a y-carriage moveably mounted to said z-reference surface to move along an axis parallel to the plane of said z-reference surface and inclined at a constant angle with respect to a y-axis;
    wherein a z-position of said y-carriage along a z-axis is determined by a corresponding position of said y-carriage along said z-reference surface and a rigid body tilt of said reference slab, and wherein the x, y, and z-axes define a Cartesian coordinate system.

2. The Cartesian robot of claim 1, wherein said y-reference surface is integral with said base member.

3. The Cartesian robot of claim 1, wherein said z-reference surface is integral with said transverse member.

4. The Cartesian robot of claim 1, wherein the z-position of said y-carriage may be determined to a precision at least $5 \times 10^{-6}$ meters rms over a 2.4 square meter scan area.

5. The Cartesian robot of claim 1, wherein said transverse member comprises a granite slab.

6. The Cartesian robot of claim 5, wherein said granite slab is supported by a structural frame.

7. The Cartesian robot of claim 6, further comprising an x-carriage movably mounted to said base member, wherein said structural frame is mounted to said x-carriage, and said granite slab is pivotally mounted to said structural frame.

8. The Cartesian robot of claim 7, further comprising a pivoting bearing mounted in said granite slab adjacent to a midpoint of the length of said granite slab, whereby said granite slab is mounted to said structural frame.

9. The Cartesian robot of claim 1, wherein said base member comprises a pair of parallel granite bases.

10. The Cartesian robot of claim 9, wherein said pair of parallel granite bases comprises a primary rail comprised of a second z-reference surface underneath said transverse member, and an outrigger rail, wherein said transverse member is flexibly mounted to said outrigger rail.

11. The Cartesian robot of claim 1, further comprising means for determining a z-position of said y-carriage along a z-axis based upon a corresponding position of said y-carriage along said z-reference surface and a measured value of a rigid body tilt of said reference slab.

12. The Cartesian robot of claim 1, wherein said y-carriage further comprises a driving frame coupled to a probe mounting plate by a point support bearing.

13. The Cartesian robot of claim 12, wherein said point support bearing further comprises two crossed rollers.

14. A Cartesian robot, comprising:
    a base member having a planar y-reference surface extending in a plane along a length of said base member;
    an x-carriage moveably mounted to said y-reference surface to move along an x-axis parallel to the plane thereof;
    a granite slab mounted to said x-carriage having a length transverse to the x-axis;
    a planar z-reference surface extending in a plane along the length of said granite slab and integral therewith; and
    a y-carriage moveably mounted to said z-reference surface to move along an axis parallel to the plane of said z-reference surface and inclined at a constant angle with respect to a y-axis.

15. The Cartesian robot of claim 14, wherein a z-position of said y-carriage along a z-axis is determined by a corresponding position of said y-carriage along said z-reference surface and a rigid body tilt of said granite slab with respect to the x-axis, and wherein the x, y, and z-axes define a Cartesian coordinate system.

16. The Cartesian robot of claim 14, wherein said granite slab is supported by a structural frame mounted to said x-carriage, and wherein said granite slab is pivotally mounted to said structural frame.

17. The Cartesian robot of claim 16, further comprising a pivoting bearing mounted in said granite slab adjacent to a midpoint of the length of said granite slab, whereby said granite slab is mounted to said structural frame.

18. The Cartesian robot of claim 14, wherein said base member comprises a air of parallel granite bases.

19. The Cartesian robot of claim 14, wherein said pair of parallel granite bases comprises a primary base comprised of a second z-reference surface underneath said transverse member, and an outrigger base, wherein said x-carriage is flexibly mounted to said outrigger base.

20. The Cartesian robot of claim 14, wherein said y-carriage further comprises a driving frame coupled to a probe mounting plate by a point support bearing.

21. The Cartesian robot of claim 20, wherein said point support bearing further comprises two crossed rollers.

22. In a Cartesian robot comprising a base member disposed along an x-axis, a transverse member moveably mounted to the base member, the transverse member disposed along an axis transverse to the x-axis and inclined at a constant angle to a y-axis, and a y-carriage moveably mounted to the transverse member along a z-reference surface within a plane defined with respect to a z-axis, wherein the x, y, and z axes define a Cartesian coordinate system; a method for determining the position of the y-carriage relative to the z-axis, said method comprising the steps of:
    measuring a position of the y-carriage along the transverse member;
    measuring a tilt of the transverse member relative to the x-axis; and determining a z-position of the measurement probe from the position of the y-carriage along the transverse member and the tilt.

23. The method of claim 22, wherein said second measuring step comprises measuring the tilt of the transverse member using a tiltmeter or electronic level.

24. The method of claim 22, further wherein said first measuring step comprises measuring the position of the y-carriage along the transverse member by counting increments of an open-loop stepper motor drive system.

* * * * *